US008626323B2

(12) United States Patent
Deng (10) Patent No.: US 8,626,323 B2
(45) Date of Patent: Jan. 7, 2014

(54) METHOD AND APPARATUS FOR PLAYING AUDIO FILES (75) Inventor: Qingshan Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 894 days.

(21) Appl. No.: 12/607,549

(22) Filed: Oct. 28, 2009

(65) Prior Publication Data

US 2010/0049349 A1 Feb. 25, 2010

Related U.S. Application Data (63) Continuation of application No. PCT/CN2008/071232, filed on Jun. 6, 2008.

(30) Foreign Application Priority Data

Aug. 17, 2007 (CN) .......................... 2007 1 0129686

(51) Int. Cl.
G06F 17/00 (2006.01)
(52) U.S. Cl.
USPC .......................................... 700/94; 715/721
(58) Field of Classification Search
USPC .......................................... 700/94; 715/721
See application file for complete search history.

(56) References Cited

U.S. PATENT DOCUMENTS

| 6,795,383 | B1 * | 9/2004 | Yamamoto et al. | 369/47.16 |
|---|---|---|---|---|
| 2004/0008975 | A1 | 1/2004 | Lin | |
| 2004/0249489 | A1 * | 12/2004 | Dick | 700/94 |
| 2008/0276173 | A1 * | 11/2008 | Li et al. | 715/716 |

FOREIGN PATENT DOCUMENTS

| CN | 1186303 | A | 7/1998 |
|---|---|---|---|
| CN | 1264121 | A | 8/2000 |
| CN | 1467726 | A | 1/2004 |
| CN | 1726556 | A | 1/2006 |
| CN | 1971742 | A | 5/2007 |
| CN | 1980390 | A | 6/2007 |
| CN | 101110247 | A | 1/2008 |

OTHER PUBLICATIONS

Written Opinion of the International Searching Authority (translation) dated (mailed) Sep. 18, 2008, issued in related Application No. PCT/CN2008/071232, filed Jun. 6, 2008, Huawei Technologies Co., Ltd.
First Chinese Office Action dated (mailed) Mar. 6, 2009, issued in related Chinese Application No. 200710129686.4 Huawei Technologies Co., Ltd.

(Continued)

Primary Examiner — Joseph Saunders, Jr.
(74) Attorney, Agent, or Firm — Conley Rose, P.C.; Grant Rodolph; Nicholas K. Beauleiu (57) ABSTRACT A method for playing audio files includes: parsing data frames of an audio file until basic information about file playing that meets the conditions for playing the audio file is obtained; and playing the audio file according to the basic information about file playing. A location and search method for an audio file includes: determining a frame position corresponding to a playing position in search according to a stored mapping between playing positions and frame positions when receiving input information about the playing position in search; and starting playing an audio file from the determined frame position. An apparatus for playing audio files is also disclosed. With the invention, the playing response speed of an audio file is improved to a great extent.

12 Claims, 8 Drawing Sheets (56) References Cited

OTHER PUBLICATIONS

Second Chinese Office Action dated (mailed) Mar. 6, 2009, issued in related Chinese Application No. 200710129686.4 Huawei Technologies Co., Ltd.

Rejection Decision dated (mailed) Jan. 29, 2010, issued in related Chinese Application No. 200710129686.4 Huawei Technologies Co., Ltd.

* cited by examiner

METHOD AND APPARATUS FOR PLAYING AUDIO FILES

CROSS-REFERENCE TO RELATED APPLICATIONS

This application is a continuation of International Application No. PCT/CN2008/071232, filed on Jun. 6, 2008, which claims priority to Chinese Patent Application No. 200710129686.4 filed on Aug. 17, 2007, both of which are hereby incorporated by reference in their entireties.

FIELD OF THE INVENTION

The present invention relates to audio playing technologies, and in particular, to a method and apparatus for playing audio files.

BACKGROUND OF THE INVENTION

In a prior art, an entity that has the audio playing function such as a multimedia mobile phone and a Moving Picture Experts Group Audio Layer III (MP3) player may play audio files stored in the entity or player or locate and search for any position in these audio files. The file structure of audio files, such as the audio files of the MP3 or Advanced Audio Coding (AAC) type, consists of multi-frame data. Each frame includes frame header data and audio data. The frame header data records the audio information of the data frame, such as the sampling rate, channel mode, and frame length. The audio data is the data that is processed through a specific compression algorithm.

Playing an audio file includes two processes, namely, parsing and decoding. Parsing is a process of obtaining audio information from the frame header of a frame contained in an audio file. Decoding is a process of restoring audio data that is processed through a compression algorithm to original Pulse Code Modulation (PCM) data.

Figure 1:
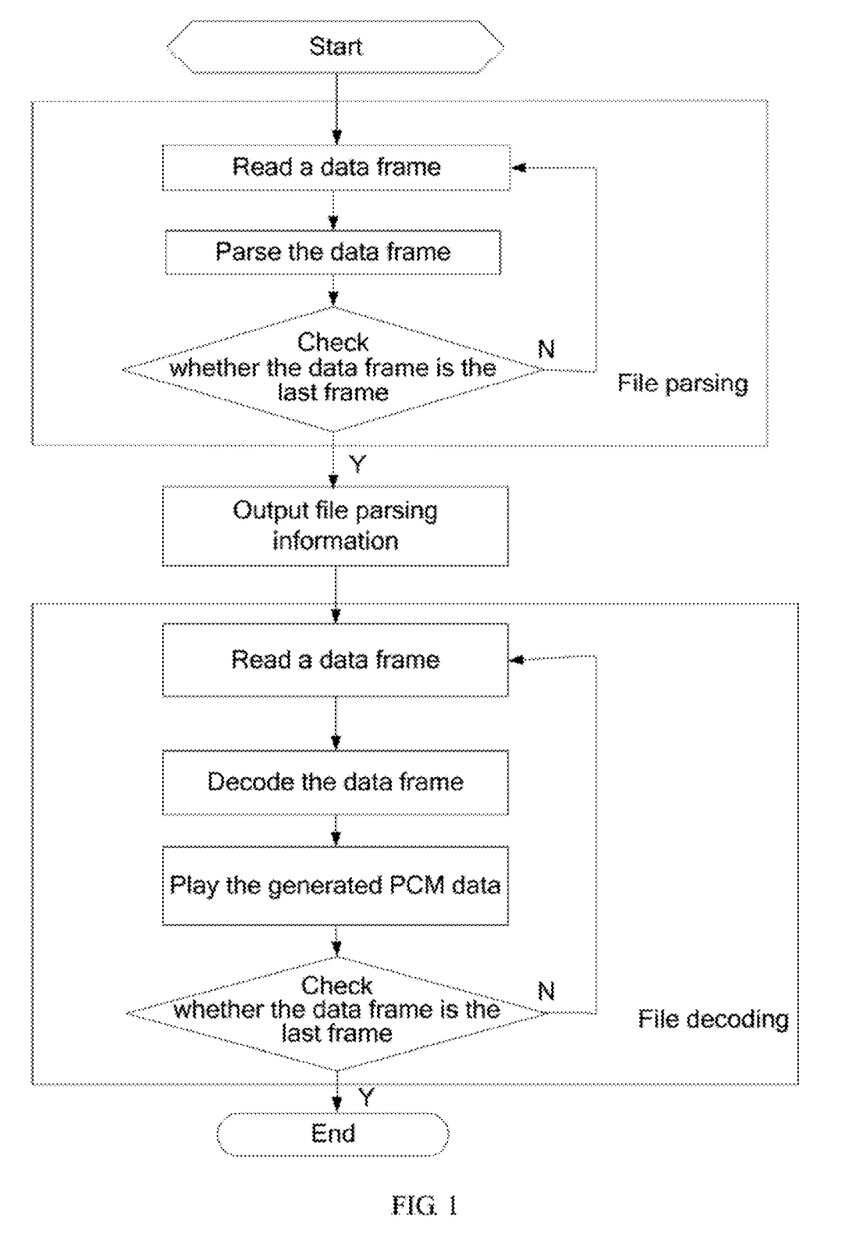
FIG. 1 shows a flow chart of playing an audio file in a prior art.

As shown in FIG. 1, when an audio file is played in a prior art, the type of the file is determined preliminarily according to the suffix of the file, and each frame of the file is parsed according to the type to obtain audio information of each frame, such as the sampling rate, channel mode, and frame length. The file information such as the sampling rate, total playing duration, and total number of frames is obtained by parsing the whole file. After the whole file is parsed, the first data frame starts to be decoded and played.

Two processes, namely, locating and playing, are included in the location and search of an audio file. Locating is a process of determining the position of a frame that is played first according to the search time in an input search command. Playing is a process of decoding and playing audio data from the determined start frame position.

Figure 2:
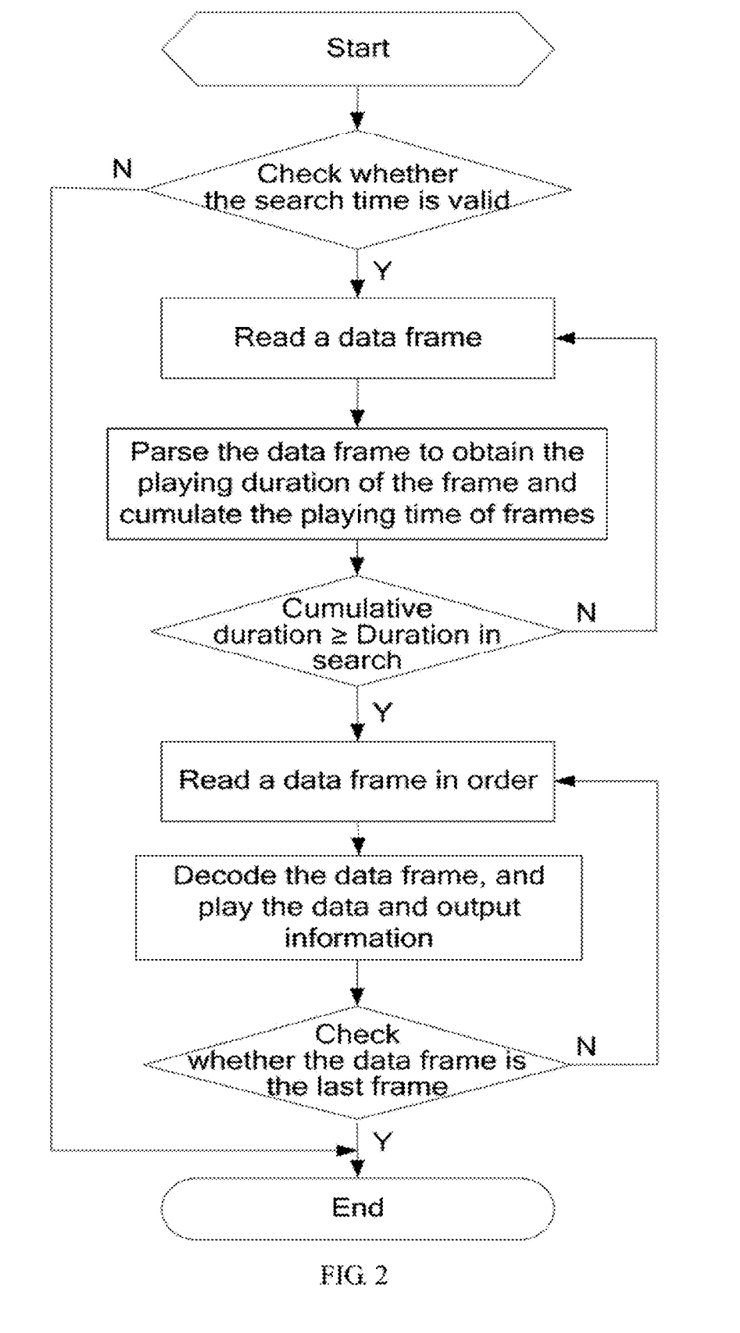
FIG. 2 shows a location and search flow chart of an audio file in a prior art.

As shown in FIG. 2, before the location and search of an audio file, validity of the search time in the search command needs to be checked. If the search time is valid, location and search can be performed. During location and search, a locating operation is performed according to the search time. The specific method is as follows: the playing duration is cumulated from the first frame of the audio file; the playing duration of each frame can be obtained from the frame header data of the data frame; when the cumulative playing duration until a frame is longer than or equal to the search time, the frame is taken as the start frame to be played. From the start frame, audio data is decoded and played. For example, if the search time is 5 s, and the playing duration of each frame is 10 ms, the cumulative playing duration until the $500^{th}$ frame is 5 s (500× 10 ms). Then the $500^{th}$ frame is taken as the start frame to be played, and data is read from the $500^{th}$ frame for decoding and playing.

In the process of implementing the present invention, the inventor finds at least the following technical defects in the prior art:

After a user starts playing an audio file, the user can hear the audio only after waiting for a long period of time due to the lower response speed. This is because the file can be played only after all the frames of the file are read and parsed when the audio file is played. When the size of a file is large, the reading speed is very low. For example, an MP3 file with the size of four MB is stored in an external storage such as a Secure Digital (SD) card; if the reading speed is one MB per second, about four seconds are required to read the entire file; that is, the user can hear the music after at least four seconds when starting playing the audio file.

Every time the user starts location and search, data starts to be read from the first frame of an audio File in the locating process, and the playing duration is cumulated until the frame position where the cumulative duration meets the search time is found. The method for location and search from the start of the file frame by frame is inefficient, and the playing response speed is low. When the search time point is close to the end time, the locating process needs to traverse the entire file. In the case of a large-sized file stored on a low-speed device, the locating process takes a longer time.

SUMMARY OF THE INVENTION

Embodiments of the present invention provide a method and apparatus for playing audio files to solve the low response speed problem in the prior art.

A method for playing audio files includes:

parsing data frames of an audio file until basic information about file playing that meets the conditions for playing the audio file is obtained; and playing the audio file according to the basic information about file playing.

Another method for playing audio files includes:

determining a frame position corresponding to a playing position in search according to an established and stored mapping between playing positions and frame positions when receiving input information about the playing position in search; and playing an audio file from the determined frame position.

An apparatus for playing audio files includes:

a parsing module 501, adapted to parse one or more data frames of an audio file until basic information about file playing that meets the conditions for playing the audio file is obtained; and a first playing module 502, adapted to play the audio file according to the basic information about file playing.

Another apparatus for playing audio files includes:

a locating and searching module 602, adapted to determine a frame position corresponding to a playing position in search according to an established and stored mapping between playing positions and frame positions when receiving input information about the playing position in search; and a third playing module 603, adapted to play an audio file from the determined frame position.

A computer readable storage medium stores a computer program that enables a processor to execute the following steps:

parsing data frames of an audio file until basic information about file playing that meets the conditions for playing the audio file is obtained; and playing the audio file according to the basic information about file playing.

A computer readable storage medium stores a computer program that enables a processor to execute the following steps:

determining a frame position corresponding to a playing position in search according to an established and stored mapping between playing positions and frame positions when receiving input information about the playing position in search; and playing an audio file from the determined frame position.

Embodiments of the present invention may bring the following benefits:

In embodiments of the present invention, when an audio file is played, the audio file starts to be played after basic information about file playing is obtained by parsing one or more data frames of the audio file. Thus, the playing response speed of the audio file is improved to a great extent. In addition, during location of an audio file, a specified start playing position can be rapidly found according to the established and stored mapping between playing positions and frame positions, and the audio file is played from the position. Thus, the location and search speed is improved to a great extent, and therefore, the playing response speed of the audio file is improved.

DETAILED DESCRIPTION OF THE INVENTION

To improve the playing response speed of an audio file, embodiments of the present invention provide a method for playing the audio file. In the method, the audio file is decoded and played after basic information required for playing the audio file is obtained by parsing one or more data frames of the audio file. Meanwhile, the audio file continues to be parsed for obtaining the complete information of the file. In the process of parsing the audio file, an index table of a mapping between playing positions and frame positions can be created for the use of location and search.

A method provided in embodiments of the present invention is hereinafter described with reference to the accompanying drawings.

Figure 3:
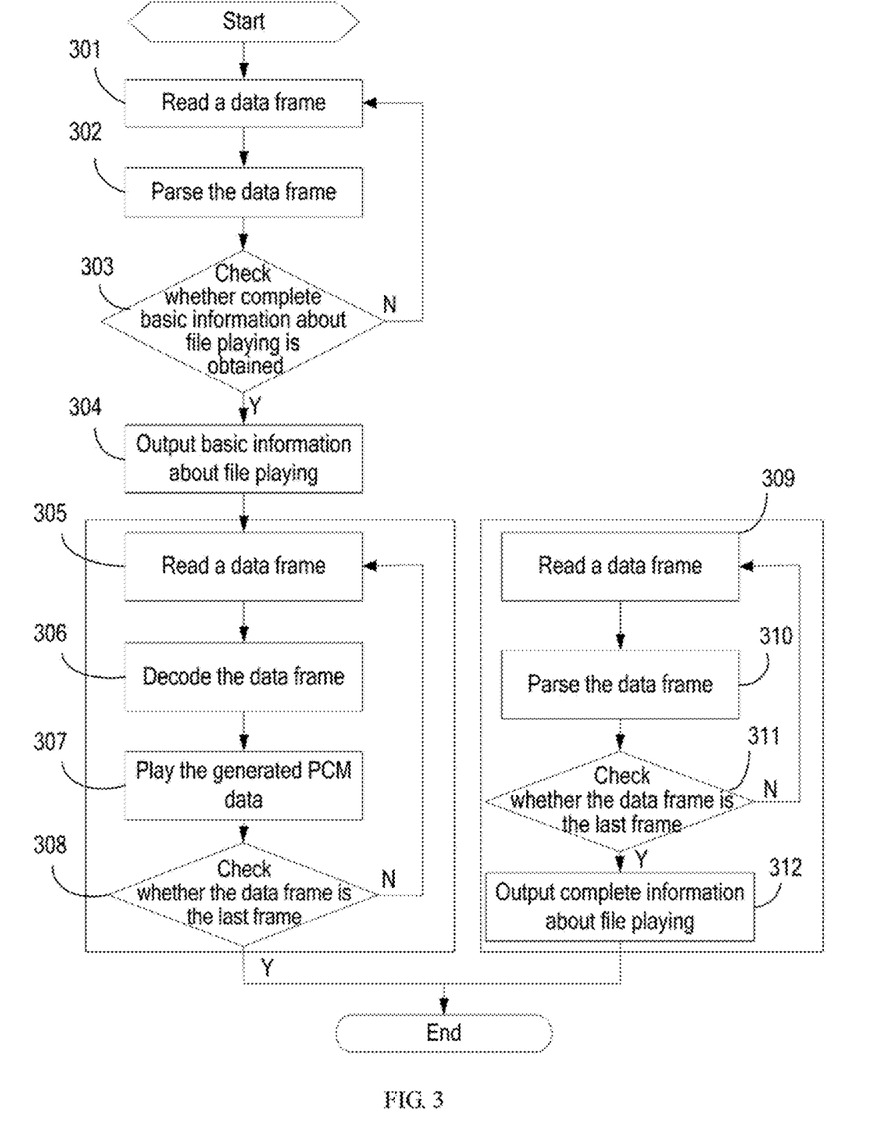
FIG. 3 shows a flow chart of playing an audio file in an embodiment of the present invention.

Step S1: Obtain basic information about file playing by parsing one or more data frames of an audio file.

As shown in FIG. 3, step S1 may include blocks 301-304.

Block 301: Read a data frame of the audio file.

The first frame of the audio file starts to be read; that is, the first frame of the audio file is read for the first time, and then the second frame of the audio file is read, and so on.

Block 302: Parse the read data frame to obtain basic information about file playing.

Obtain the required basic information about file playing from the frame header data of the data frame by parsing the data frame. The basic information about file playing is the information required for playing the audio file. For example, the basic information about file playing of an MP3 or ACC audio file includes the sampling rate, sample precision, and channel mode.

Also, the obtained basic information about file playing may be stored, for example, stored to a frame index table for the use of location, search and playing.

Block 303: Check whether the obtained basic information about file playing is complete. If yes, proceed to block 304; otherwise, go to block 301, and read the next data frame until the complete basic information about file playing is obtained.

Block 304: Output the obtained basic information about file playing for the use of file decoding and playing.

Generally, the complete basic information about file playing can be obtained by parsing the first one or two data frames of an audio file.

Step S2: Decode and play the audio file according to the basic information about file playing obtained in step S1.

As shown in FIG. 3, step S2 includes blocks 305-308.

Block 305: Read a data frame of the audio file.

The first frame of the audio file starts to be read; that is, the first frame of the audio file is read for the first time, and then the second frame of the audio file is read, and so on.

Block 306: Decode the read data frame according to the basic information about file playing output in step 304 to generate PCM data.

Block 307: Play the generated PCM data.

Block 308: Check whether the currently played data belongs to the last frame. If yes, the playing is complete: otherwise, go to block 305, and read the next data frame for decoding and playing until the playing is complete.

When step S2 is executed, step S3 (further parse the audio file to obtain complete information about file playing) may also be executed concurrently.

As shown in FIG. 3, step S3 includes blocks 309-312.

Block 309: Read a data frame of the audio file.

Read a data frame next to the parsed data frame in step S1, and then read the next data frame, and so on.

Block 310: Parse the read data frame to obtain the audio information corresponding to the data frame.

Block 311: Check whether the current frame is the last frame. If yes, proceed to block 312: otherwise, go back to step 309 to read the next data frame until all frame data is parsed.

Block 312: Obtain and output complete information about file playing according to audio information of each frame.

In addition to basic information such as the sampling rate, sample precision, and channel mode, complete information about file playing also includes the bit rate, total playing duration, and total number of frames of an audio file. With regard to an audio file of the MP3 type, the complete information about file playing may also include the production and publication information, such as the song name, lyric writer, composer, singer, band, and special. The information except the basic information may control the end of playing an audio file and supports the information query of an audio file. For example, the information may control the end of playing an audio file by comparing the current playing duration with the total playing duration or comparing the relation between the current number of played frames and the total number of frames; the information related to an audio file, such as the song name, lyric writer, and composer is displayed. The information is not necessary information about audio file playing. Therefore, in embodiments of the present invention, a file is decoded and played after basic information about file playing is obtained to reduce the playing waiting time.

In embodiments of the invention, steps S2 and S3 may be executed concurrently. According to the multi-task feature of the system, the system schedules one execution process for S2 and S3 respectively. The two processes execute their own tasks concurrently. The task of S1 is complete first. The concurrent execution time of the two processes is within several seconds. Therefore, smooth file playing is not affected.

In view of the requirements for the location and search of an audio file, after one data frame is parsed in step S3, audio information such as the playing duration and the size of the data frame is obtained. According to the information, a mapping between playing positions and frame positions is established, and the mapping is stored (such as in a frame index table). Specifically, the mapping may include but not be limited to the mapping between playing time points and frame positions or the mapping between frame numbers and frame positions. The specific method is as follows:

After the playing duration and the frame size are obtained by parsing one data frame, the second cumulative duration is obtained by adding up the playing duration and the first cumulative duration, and the size of the second cumulative frame is obtained by adding up the size of the data frame and the size of the first cumulative frame. The first cumulative duration is the sum of the playing durations of the data frames previously traversed. The size of the first cumulative frame is the sum of the sizes of the data frames previously traversed. Obviously, with regard to the first frame, the first cumulative duration and the size of the first cumulative frame are zero. With regard to the next frame, the first cumulative duration and the size of the first cumulative frame used for calculation are respectively the second cumulative duration and the size of the second cumulative frame obtained when the previous frame is calculated.

Then, a frame index table is created according to the obtained second cumulative duration and the size of the second cumulative frame, and a mapping between the second cumulative duration and the size of the second cumulative frame is stored in the frame index table. Thus, after all frames are traversed, a mapping between the playing time point and the frame position of each frame is stored in the frame index table. The frame index table may also be created according to a previously specified mark time point. In this case, a mapping between the pre-mark tine point and the size of the second cumulative frame can be stored when the second cumulative duration is longer than or equal to the pre-mark time point. For example, the playing duration of each frame is 150 ms, and the size of each frame is 600 bytes. According to the specification, the frame position is stored at each second. When the seventh frame is traversed, the obtained second cumulative duration is 1050 (150+900=1050) ms (which is longer than 1 s), and the size of the second cumulative frame is 4200 (600+3600=4200) bytes. In this case, a mapping between the playing time point (1 s) and the frame position (4200 bytes) is stored. Similarly, when the $14^{th}$, $21^{st}$, and $28^{th}$ frames are traversed respectively, a mapping between the playing time points (2 s, 3 s, and 4 s) and the frame positions, namely, a mapping between 2 s and 8400 bytes, a mapping between 3 s and 12600 bytes, and a mapping between 4 s and 16800 bytes, is stored respectively.

With regard to the method for establishing a mapping between frame numbers and frame positions, after the size of one frame is obtained, the size of the second cumulative frame is obtained by adding up the size of the data frame and the size of the first cumulative frame. The size of the first cumulative frame is the sum of the sizes of the frames previously traversed. With regard to the first frame, the size of the first cumulative frame is 0. With regard to the next frame, the size of the first cumulative frame used for calculation is the size of the second cumulative frame obtained when the previous frame is calculated. According to the size of the obtained second cumulative frame, a frame index table is created. The frame index table stores a mapping between the number of the data frame and the size of the second cumulative frame. Thus, when all frames are traversed, a mapping between frame numbers and frame positions is stored.

Figure 4:
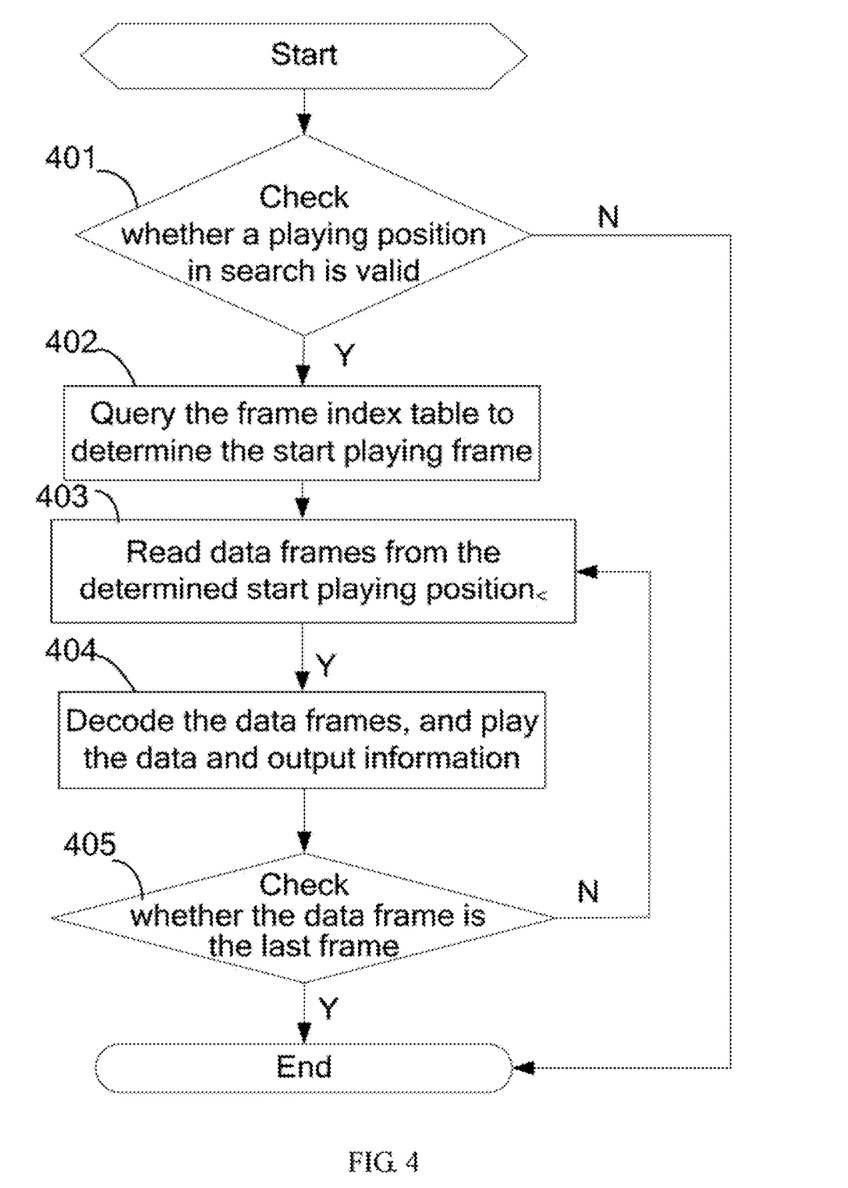
FIG. 4 shows a location and search flow chart of an audio file in an embodiment of the present invention.

After all frames are traversed and parsed, the frame index table is created accordingly, and then is output and stored. When a user uses the location and search function of an audio file, the created frame index table may be used to implement the location and search function after a location and search command carrying the playing position information in search is input. The specific process shown in FIG. 4 is as follows:

Block 401: Check whether the playing position in search is valid. If yes, go to block 402. Otherwise, end the process.

When the playing position in search is the playing time point in search, a valid playing time point in search is a time point that does not exceed the total playing duration of an audio file. If a time point exceeds the total playing duration of an audio file, the search time point is invalid. For example, in the case of an audio file whose total playing duration is 15 minutes, if the playing time point in search is 20 minutes, the time point is an invalid search time point; if the playing position in search is a frame number, a valid frame number in search does not exceed the frame number range contained in the audio file. If a frame number in search exceeds the frame number range contained in the audio file, the frame number is invalid.

Block 402: Query the frame index table, determine a frame position corresponding to a playing position in search, and take the determined frame position as the start playing position.

When querying the frame index table, find an entry that matches the playing position in search. The playing position contained in the entry is the same as or most close to the playing position in search. During location, use the frame position corresponding to the playing position to locate the pointer of the audio file, and take the position indicated by the pointer as the start playing position.

Block 403: Read data frames from the start playing position determined in the previous block.

Block 404: Decode the read data frames to generate PCM data, and play the generated PCM data.

In this block, decode the read data frames according to the obtained basic information about file playing to generate PCM data, and then play the generated PCM data. The specific method for obtaining basic information about file playing may be as follows: obtain basic information about file playing by querying the frame index table; or add a step of obtaining basic information about file playing by parsing one or more data frames of the audio file between blocks 402-403. For details, see the foregoing blocks 301-304. After the basic information about file playing is obtained, the audio file may be parsed concurrently when the audio file is played to obtain complete information about file playing. For details, see the foregoing blocks 309-312.

Block 405: Check whether the current frame is the last frame. If yes, end the process; otherwise, go to block 403 to read the next data frame until the last data frame is played.

When reading the next data frame in block 403, move the pointer of the current audio file to the next frame position and read the data frame in the position.

In certain special cases, for example, when a user starts the location and search function of an audio file, and the audio file has never been played before, no created frame index table exists. Therefore, a temporary frame index table needs to be created. The method for creating a temporary frame index table is the same as the method for creating a frame index table when an audio file is parsed. That is, parse each data frame, and fill up the frame index table according to the playing duration and the size of each frame obtained by parsing data frames.

Create a frame index table in advance, find the start frame position corresponding to the search time point rapidly according to the frame index table during location and search, and then play the audio file from the position. Thus, the search and location may be implemented efficiently.

Figure 5:
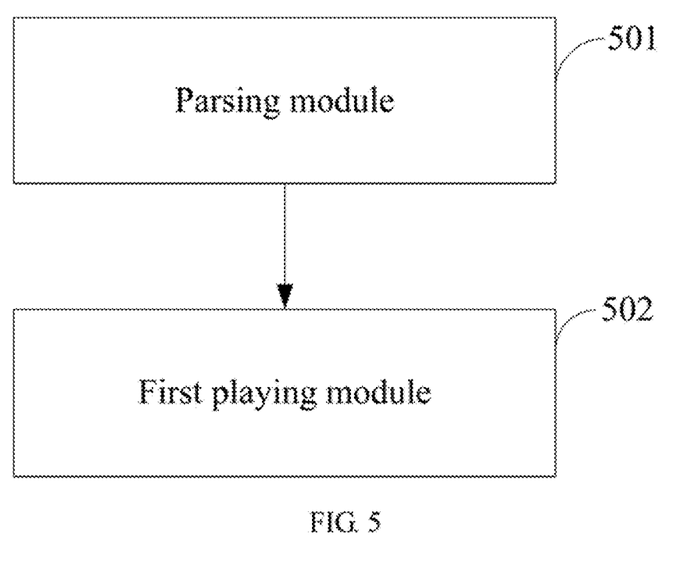
FIG. 5 shows an architecture diagram of an apparatus for playing audio files in an embodiment of the present invention.

As shown in FIG. 5, an embodiment of the present invention further provides an apparatus for playing audio files. The apparatus includes a parsing module 501 and a first playing module 502.

The parsing module 501 is adapted to parse one or more data frames of an audio file until basic information about file playing that meets the conditions for playing the audio file is obtained. The basic information about file playing is the information required for playing the audio file, which includes but is not limited to the sampling rate, sample precision, and channel mode.

The first playing module 502 is adapted to play the audio file according to the basic information about file playing.

Figure 6:
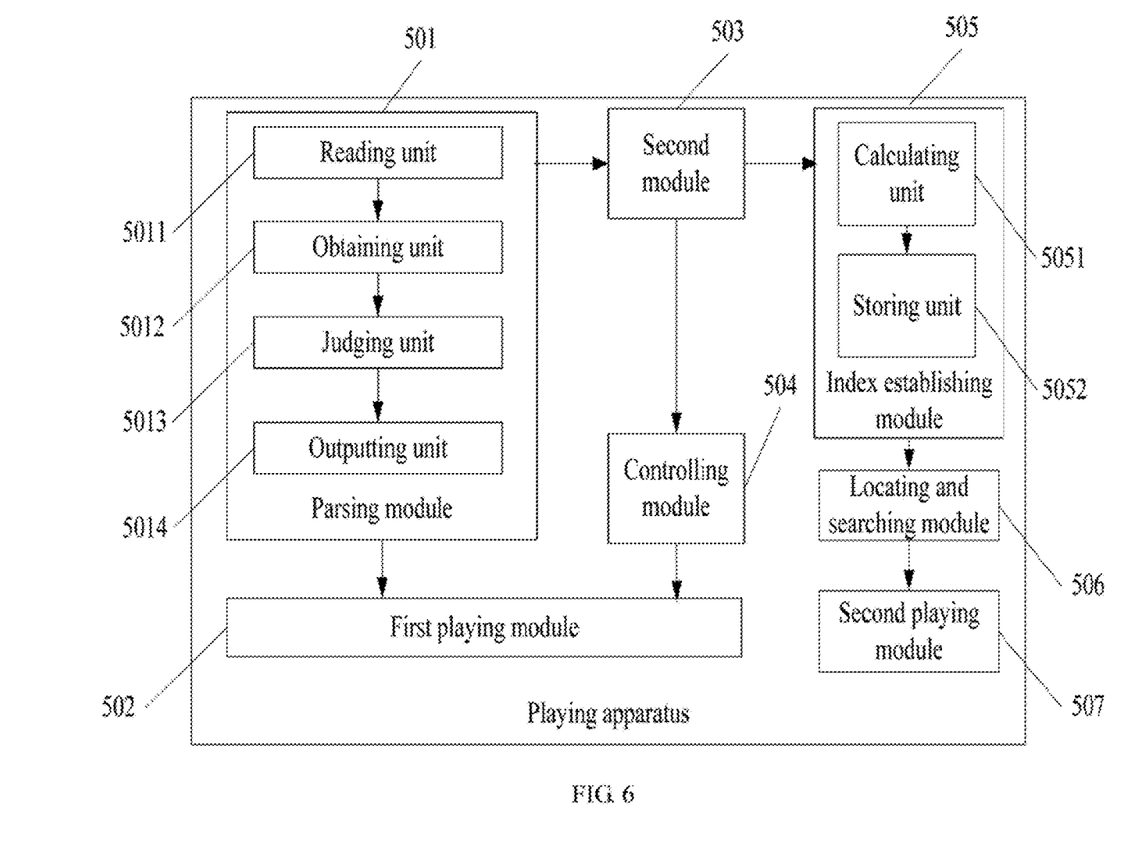
FIG. 6 shows another architecture diagram of an apparatus for playing audio files in an embodiment of the present invention.

As shown in FIG. 6, an embodiment of the present invention further provides a structure of an apparatus for playing audio files. The apparatus includes a parsing module 501 and a first playing module 502.

The parsing module 501 includes a reading unit 5011, an obtaining unit 5012, a judging unit 5013, and an outputting unit 5014. The reading unit 5011 is adapted to read data frames of an audio file. The obtaining unit 5012 is adapted to parse the data frames read by the reading unit 5011 to obtain basic information about file playing. The judging unit 5013 is adapted to check whether the currently obtained basic information about file playing is complete, and if yes, notify the outputting unit 5014 to output the obtained basic information about file playing; otherwise, notify the reading unit 5011 to read the next data frame. The outputting unit 5014 is adapted to output the obtained basic information about file playing.

The apparatus further includes a second module 503 and a controlling module 504. The second module 503 is adapted to continue to parse data frames of the audio file from the data frame next to the data frames parsed by the parsing unit to obtain complete information about file playing when the first playing unit plays the audio file. The controlling module 504 is adapted to control the end of playing the audio file and output information related to the audio file according to the complete information about file playing.

The apparatus further includes an index establishing module 505, a locating and searching module 506, and a second playing module 507. The index establishing module 505 is adapted to establish and store a mapping between playing positions and frame positions according to the audio information obtained by the parsing module 501 and the second module 503 through a parsing operation. The audio information includes the playing duration and the frame size. The playing position includes a playing time point or frame number. The locating and searching module 506 is adapted to determine the frame position corresponding to the playing position in search according to the mapping when receiving input playing position information in search. The second playing module 507 is adapted to play the audio file from the determined frame position.

The index establishing module 505 includes a calculating unit 5051 and a storing unit 5052. The calculating unit 5051 is adapted to calculate the second cumulative duration and the size of the second cumulative frame after the playing duration and the frame size of data frames are obtained by parsing data frames. Specifically, the calculating unit 5051 includes a first cumulative unit, which is adapted to calculate the second cumulative duration (The second cumulative duration is equal to the first cumulative duration plus the playing duration, and the first cumulative duration is the sum of the playing durations of all data frames before the data frame); and a second cumulative unit, which is adapted to calculate the size of the second cumulative frame (The size of the second cumulative frame is equal to the size of the first cumulative frame plus the size of the data frame, and the size of the first cumulative frame is the sum of the sizes of all data frames before the data frame). The storing unit 5052 is adapted to establish and store a mapping between the playing time point and the frame position by taking the second cumulative duration as the playing time point and taking the size of the second cumulative frame as the frame position, or establish and store a mapping between the playing time point and the frame position by taking the current pre-mark time point as the playing time point and taking the size of the second cumulative frame as the frame position when the second cumulative duration is longer than or equal to the current pre-mark time point.

Figure 7:
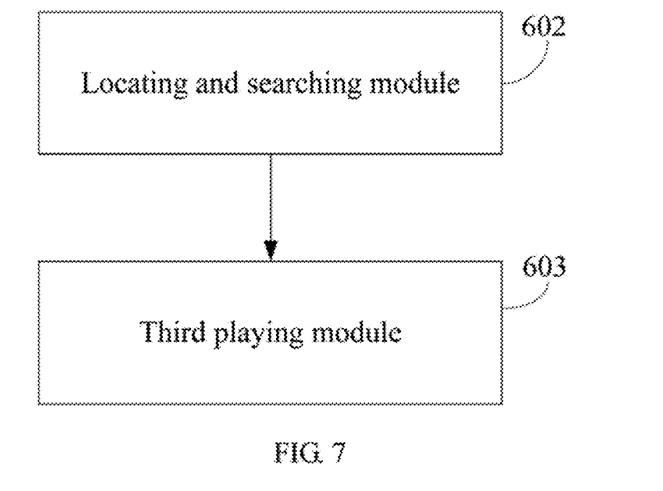
FIG. 7 shows a third architecture diagram of an apparatus for playing audio files in an embodiment of the present invention.

As shown in FIG. 7, an embodiment of the present invention further provides an apparatus for playing audio files. The apparatus includes a locating and searching module 602 and a third playing module 603. The locating and searching module 602 is adapted to determine the frame position corresponding to the playing position in search according to the mapping when receiving input playing position information in search. The third playing module 603 is adapted to play the audio file from the determined frame position.

The apparatus further includes an index establishing module 601, which is adapted to parse the data frames of an audio file to obtain audio information and establish and store a mapping between playing positions and frame positions according to the audio information. The audio information includes the playing duration and the frame size. The playing position includes a playing time point or frame number.

Figure 8:
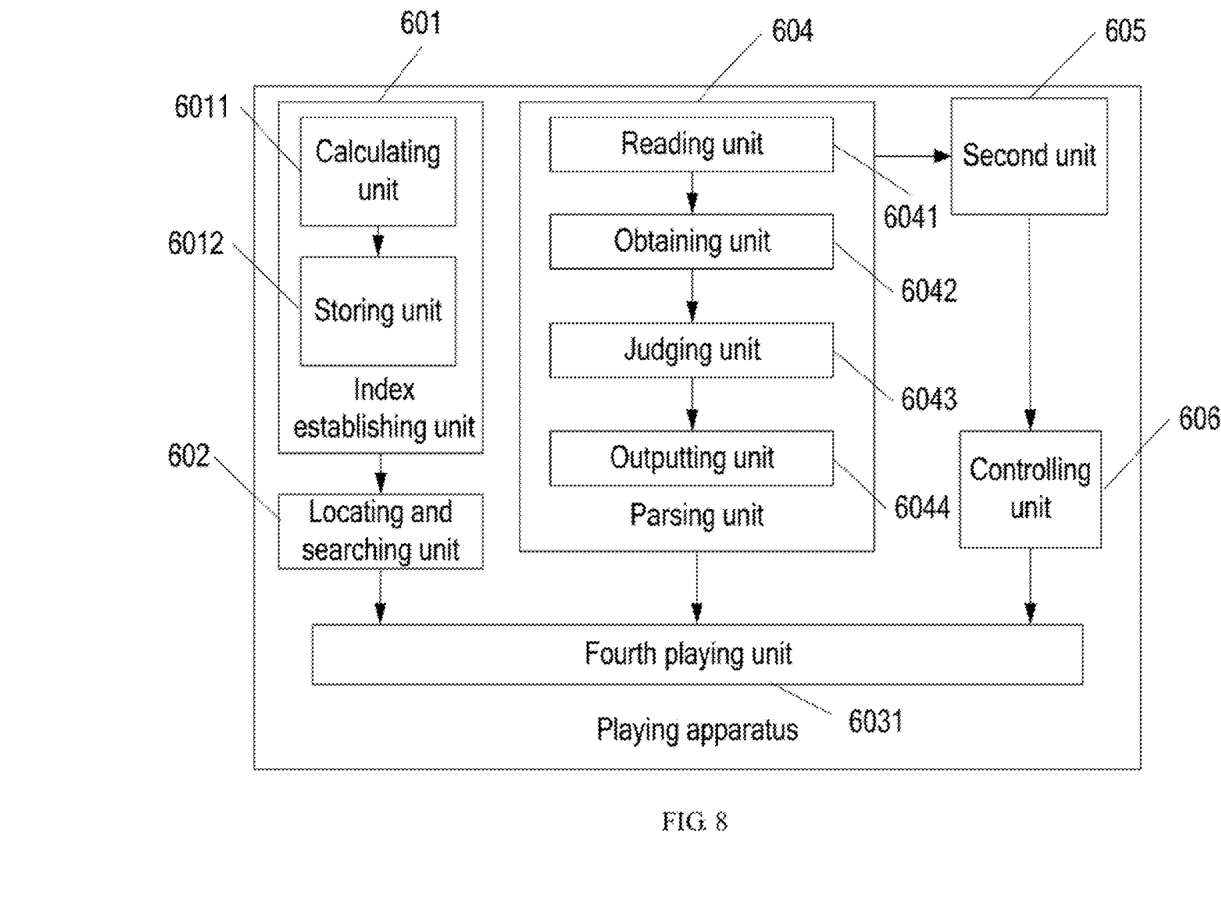
FIG. 8 shows a fourth architecture diagram of an apparatus for playing audio files in an embodiment of the present invention.

As shown in FIG. 8, an embodiment of the present invention further provides a stricture of an apparatus for playing audio files.

The index establishing module 601 includes a calculating unit 6011 and a storing unit 6012. The calculating unit 6011 is adapted to calculate the second cumulative duration and the size of the second cumulative frame after the playing duration and the frame size of data frames are obtained by parsing data frames. Specifically, the calculating unit 6011 includes a first cumulative unit, which is adapted to calculate the second cumulative duration (The second cumulative duration is equal to the first cumulative duration plus the playing duration, and the first cumulative duration is the sum of the playing durations of all data frames before the data frame); and a second cumulative unit, which is adapted to calculate the size of the second cumulative frame (The size of the second cumulative frame is equal to the size of the first cumulative frame plus the size of the data frame, and the size of the first cumulative frame is the sum of the sizes of all data frames before the data frame). The storing unit 6012 is adapted to establish and store a mapping between the playing time point and the frame position by taking the second cumulative duration as the playing time point and taking the size of the second cumulative frame as the frame position, or establish and store a mapping between the playing time point and the frame position by taking the current pre-mark time point as the playing time point and taking the size of the second cumulative frame as the frame position when the second cumulative duration is longer than or equal to the current pre-mark time point.

The apparatus further includes a parsing module 604. The parsing module 604 is adapted to parse one or more data frames of an audio file until basic information about file playing that meets the conditions for playing the audio file is obtained. The basic information about file playing is the information required for playing the audio file, which includes but is not limited to the sampling rate, sample precision, and channel mode.

The third playing module 603 includes a fourth playing unit 6031. The fourth playing unit 6031 is adapted to play the audio file according to the basic information about file playing.

The parsing module 604 includes a reading unit 6041, an obtaining unit 6042, a judging unit 6043, and an outputting unit 6044. The reading unit 6041 is adapted to read data frames of the audio file. The obtaining unit 6042 is adapted to parse the data frames read by the reading unit 6041 to obtain basic information about file playing. The judging unit 6043 is adapted to check whether the currently obtained basic information about file playing is complete, and if yes, notify the outputting unit 6044 to output the obtained basic information about file playing; otherwise, notify the reading unit 6041 to read the next data frame. The outputting unit 6044 is adapted to output the obtained basic information about file playing.

The apparatus further includes a second module 605 and a controlling module 606. The second module 605 is adapted to continue to parse data frames of the audio file from the data frame next to the data frames parsed by the parsing unit 604 to obtain complete information about file playing when the fourth playing unit 6031 plays the audio file. The controlling module 606 is adapted to control the end of playing the audio file and output information related to the audio file according to the complete information about file playing.

Therefore, embodiments of the present invention may bring the following benefits:

1. An audio file starts to be played after basic information about file playing is obtained through a parsing operation. The subsequent parsing and decoding operations change from serial operations into concurrent operations. Thus, the playing waiting time is saved to a great extent, and a response at the start playing time can be made within one or two seconds irrespective of the file size and the storage medium.

2. The search algorithm is optimized by creating a frame index table. Thus, the response time corresponding to different search positions is consistent, and the response speed in searching and playing is enhanced to a great extent.

It is understandable to those skilled in the art that all or part of the steps of the foregoing embodiments may be implemented by hardware instructed by a program. The program may be stored in a computer readable storage medium, such as a Read-Only Memory (ROM), a Random Access Memory (RAM), a magnetic disk and a compact disk.

Although the present invention has been described through some exemplary embodiments, the invention is not limited to such embodiments. It is apparent that those skilled in the art can make various modifications and variations to the invention without departing from the spirit and scope of the present invention. The invention is intended to cover these modifications and variations provided that they fall in the scope of protection defined by the following claims or their equivalents.

What is claimed is:

1. A method for playing an audio file, comprising:
    determining a frame position corresponding to a playing position in a search according to a mapping between playing positions and frame positions when receiving input information about the playing position in the search; and
    playing the audio file from the determined frame position, wherein the mapping between the playing positions and the frame positions is obtained by:
        calculating a second cumulative duration and a size of a second cumulative frame after a playing duration and a size of a data frame are obtained by parsing the audio file, wherein the second cumulative duration is equal to a first cumulative duration plus the playing duration, wherein the first cumulative duration is a sum of playing durations of all data frames before the data frame, wherein the size of the second cumulative frame is equal to a size of a first cumulative frame plus the size of the data frame, and wherein the size of the first cumulative frame is a sum of sizes of all the data frames before the data frame; and
        establishing and storing the mapping between the playing positions and the frame positions before receiving the input information about the playing position in the search by taking the second cumulative duration as one of the playing positions and taking the size of the second cumulative frame as one of the frame positions, or establishing and storing the mapping between the playing positions and the frame positions by taking a current pre-mark time point as one of the playing positions and taking the size of the second cumulative frame as one of the frame positions when the second cumulative duration is longer than or equal to the current pre-mark time point, and
    wherein determining the frame position comprises retrieving the stored mapping between the playing positions and the frame positions and identifying the frame position corresponding to the playing position in the stored mapping.

2. The method of claim 1, wherein the playing position in the search comprises a playing time point or a frame number.

3. The method of claim 1, wherein playing the audio file from the determined frame position comprises:
    parsing one or more data frames of the audio file until basic information that meets a condition for playing the audio file is obtained; and
    according to the basic information, playing the audio file from the determined frame position.

4. The method of claim 3, wherein parsing the one or more data frames of the audio file until basic information that meets the condition for playing the audio file is obtained comprises:
    reading the data frame of the audio file;
    parsing the data frame of the audio file to obtain the basic information; and
    outputting the obtained basic information when complete basic information about file playing is obtained; otherwise, reading a next data frame.

5. The method of claim 3, wherein the basic information comprises at least one of: a sampling rate, a sample precision, and a channel mode.

6. The method of claim 3, further comprising:
continuing to parse data frames of the audio file to obtain complete information about file playing; and
controlling an end of playing the audio file and outputting information related to the audio file according to the complete information about file playing.

7. An apparatus for playing an audio file, comprising:
a locating and searching module adapted to determine a frame position corresponding to a playing position in a search according to a mapping between playing positions and frame positions when receiving input information about the playing position in the search;
a playing module adapted to play the audio file from the determined frame position; and
an index establishing module, wherein the index establishing module comprises:
a calculating unit adapted to calculate a second cumulative duration and a size of a second cumulative frame after a playing duration and a size of a data frame are obtained by parsing the audio file, wherein the second cumulative duration is equal to a first cumulative duration plus the playing duration, wherein the first cumulative duration is a sum of playing durations of all data frames before the data frame, wherein the size of the second cumulative frame is equal to a size of a first cumulative frame plus the size of the data frame, and wherein the size of the first cumulative frame is a sum of sizes of all the data frames before the data frame; and
a storing unit adapted to establish and store the mapping between the playing positions and the frame positions before receiving the input information about the playing position in the search by taking the second cumulative duration as one of the playing positions and taking the size of the second cumulative frame as one of the frame positions, or establish and store the mapping between the playing positions and the frame positions by taking a current pre-mark time point as one of the playing positions and taking the size of the second cumulative frame as one of the frame positions when the second cumulative duration is longer than or equal to the current pre-mark time point, and wherein the locating and searching module is adapted to determine the frame position by retrieving the stored mapping between the playing positions and the frame positions and identifying the frame position corresponding to the playing position in the stored mapping.

8. The apparatus of claim 7, wherein the playing position in the search comprises a playing time point or a frame number.

9. The apparatus of claim 7, further comprising:
a parsing module adapted to parse one or more data frames of the audio file until basic information that meets a condition for playing the audio file is obtained; and
a second playing module adapted to play the audio file from the determined frame position according to the basic information.

10. The apparatus of claim 9, wherein the parsing module comprises:
a reading unit adapted to read the data frame of the audio file;
an obtaining unit adapted to parse the data frame read by the reading unit to obtain the basic information;
a judging unit adapted to determine whether complete basic information about file playing is obtained, and if so, notify an outputting unit to output the obtained basic information; otherwise, notify the reading unit to continue to read a next data frame; and
the outputting unit adapted to output the obtained basic information.

11. The apparatus of claim 9, wherein the basic information about file playing comprises at least one of: a sampling rate, a sample precision, and a channel mode.

12. The apparatus of claim 9, further comprising:
a second module adapted to continue to parse data frames of the audio file to obtain complete information about file playing when the first playing unit plays the audio file; and
a controlling module adapted to control an end of playing the audio file and output information related to the audio file according to the complete information about file playing.

* * * * *

UNITED STATES PATENT AND TRADEMARK OFFICE
CERTIFICATE OF CORRECTION

PATENT NO. : 8,626,323 B2  
APPLICATION NO. : 12/607549  
DATED : January 7, 2014  
INVENTOR(S) : Qingshan Deng Page 1 of 1

It is certified that error appears in the above-identified patent and that said Letters Patent is hereby corrected as shown below:

Title Page, References Cited, under Other Publications, the following cited art should read:

First Chinese Office Action dated (mailed) Mar. 6, 2009, issued in related Chinese Application No. 200710129686.4, Huawei Technologies Co., Ltd.

Title Page, (74) Attorney, Agent, or Firm, should read: Conley Rose, P.C.; Grant Rodolph; Nicholas K. Beaulieu Title Page 2, References Cited, under Other Publications, the following cited art should read:

Second Chinese Office Action dated (mailed) Sep. 4, 2009, issued in related Chinese Application No. 200710129686.4, Huawei Technologies Co., Ltd.

Rejection Decision dated (mailed) Jan. 29, 2010, issued in related Chinese Application No. 200710129686.4, Huawei Technologies Co., Ltd.

Signed and Sealed this  
First Day of April, 2014

Michelle K. Lee  
*Deputy Director of the United States Patent and Trademark Office*